3,639,593
SOIL INSECTICIDE OF PARATHION AND
PARAFORMALDEHYDE
David Eugene Garrison, P.O. Box 173,
Greeley, Colo. 80631
No Drawing. Filed May 1, 1969, Ser. No. 821,079
Int. Cl. A01n 9/36, 9/24
U.S. Cl. 424—218                              5 Claims

ABSTRACT OF THE DISCLOSURE

The invention is a soil pesticide which combines parathion and paraformaldehyde into a carrier, preferably a granular clay. In a preferred blend, approximately equal parts of parathion and paraformaldehyde are used and these active ingredients constitute approximately 10% of the blend.

---

This invention relates to the compounding and blending of soil pesticides, a primary object of the invention being to provide an improved soil pesticide which will effectively protect root crops without leaving any residue upon the crops.

The present invention, a soil pesticide, is useful for any crop where the root growths must be protected, but it has special utility when used to protect sugar beets from various types of soil pests. Accordingly, the invention is described herein in connection with its use in protecting sugar beets.

A variety of pests living in the soil thrive on root growths and will attack root crops such as sugar beets to the point where a crop is reduced in value or even lost. Insofar as sugar beets are concerned, three types of pests are well known, and a field may become infested with one or all three and at various stages of the plant growth. The garden symphylan, commonly known as a white centipede, is a pest of the arthropod type and thrives in moist ground. The sugar beet root maggot is the larva of a fly representative of a diptra type of insect. The nematode is a small worm found in the soil representative of yet another type of common pest.

These three different types of common pests point up the need for a versatile soil pesticide which is capable of killing many types of pests, not merely one type. Basically, a highly toxic substance is needed. Moreover, it is desirable to introduce the pesticide into the soil when the soil is being cultivated and before planting. However, a field infestation, such as by a maggot, may not occur until after the crop is planted and partially grown. This points up the need for a soil pesticide which will retain its potency for a substantial period of time. On the other hand, where root crops are grown for animal and human consumption, there exists a further need for a pesticide which will not leave any undesirable residium upon the crop after it has been harvested.

It is to be noted that this need for a crop free of any pesticide residue is almost the antithesis of the need for a toxic, long lasting pesticide and there is an ever increasing awareness of problems concerning undesirable, deleterious, residual substances resulting from the use of pesticides. Several very effective pesticides such as D.D.T. are no longer recommended for many purposes because of undesirable substances which will be retained by the plants and will remain in the soil for a long period of time after the crops are harvested and after the pesticide is no longer needed or wanted. On the other hand, an effective soil pesticide for a root crop cannot be merely a vaporous material which will be effective for only a few days.

The present invention was discovered and developed with such considerations in view and comprises, in essence, a blend of ethyl parathion and/or methyl parathion with paraformaldehyde. This blend is mixed into an inert carrier of any convenient form such as in pellets so that it may be easily disseminated onto a field prior to plowing or cultivating the field. The parathion group is well known as potent toxic insecticides, but are considered as being vaporous or inclined to vaporize or disseminate in a short period of time and clearly, are not suitable for soil insecticides. For some reason not at all understood, the paraformaldehyde acts as a stabilizer or extender for the parathion to extend the effective period during which the pesticide is toxic.

The objects of this invention are to provide a novel blend of components to produce an improved soil pesticide which: is especially adapted to protect root crops such as sugar beets from underground pests; has a high toxicity, sufficient to effectively eliminate any of several types of soil pests which may be present in the ground; can be applied to the soil before planting a crop, yet remain effective for a substantial time period thereafter, sufficient to protect the crop while the seeds germinate and the plants develop and mature; will be effectively dissipated from the ground before the crop is ready for harvest to such an extent that no trace of the material will remain on the plants; is reliable and consistent in its actions; is a very economical, low cost soil treatment; and is produced from easily available reagents.

These and other objects of the invention will become apparent from the following description of the manner in which the components thereof are interblended and of a preferred embodiment of the invention.

Ethyl parathion, commonly called parathion and technically known as O,O-diethyl O-p-nitrophenyl thiophosphate, is an exceptionally potent insecticide and acaricide. The material is commercially available as a straw to amber liquid having a boiling point ranging from 157–162 degrees C. It may also have a characteristic odor.

Methyl parathion is similar in its formulation to ethyl parathion and is also a potent insecticide. However, the methyl parathion is a more viscous material and is apt to solidify at ambient temperature. Ethyl parathion and methyl parathion can be easily blended together and in the present invention, these two materials can be blended together in any suitable proportion to produce a liquid of any desired viscosity so that it may be mixed into any specific carrier as hereinafter described. Accordingly, the term "parathion" will be hereinafter used to indicate any suitable blend unless otherwise specified.

Both types of parathion, though highly toxic, will deteriorate or dissipate in a few days when exposed to the elements and especially alkaline materials. Because of this property, parathion has been used in a diluted form in dusts, liquid sprays and aerosols for commercial application to plants to control such pests as weevils, boll worms, aphids and the like. The material is so highly toxic that an individual applying it to plants in a field must be fully protected by wearing vapor-proof clothing and a gas mask. Parathion would not be a desirable pesticide for dusts and aerosols if it did not deteriorate or dissipate within a few days. For the same reason, parathion is not desirable or practical as a soil insecticide since the potency and toxicity of a soil insecticide must be extended to not only kill the pests in the soil at the time of application, but also to prevent a subsequent infestation of soil pests.

Paraformaldehyde, sometimes referred to as paraform, and technically as polyoxymethylene, is a polymer of a formaldehyde in the form of a white solid having a slight formaldehyde odor. Ordinarily, paraformaldehyde is insoluble in water and is also apparently insoluble in parathion. Paraformaldehyde is normally used as a disinfectant, a fumigant and a fungicide in addition to uses such as blending with other resins in connection with the manufacture of solid plastics or glues with which this application is not concerned.

In the present invention, parathion and paraformaldehyde, the active ingredients, are blended with an inert carrier such as clay. The carrier may also be any other inorganic material such as vermiculite or diatomaceous earth, or an organic material such as manure, such materials being defined herein as "granular." The primary purpose of the carrier is to provide sufficient bulk in the blend as to contain the active ingredients and to permit a comparatively small amount of the active ingredients to be easily, uniformly dispersed over a field. For example, it was found that from three to six pounds of active ingredients per acre would be an adequate amount to control soil pests, but that it would be much easier to disperse this material when it is mixed with as much as fifty pounds of a carrier. A preferred type of carrier is a pelletized or granular clay of a type sized to pass an 8 mesh and be retained on a 20 mesh screen.

The proportions of the active ingredients to this carrier are preferably approximately 10% active ingredients–90% carrier, but such is not critical. For example, these proportions may be varied from approximately 50% active ingredients—50% carrier to approximately 1% active ingredients–99% carrier so long as the desired amount of active ingredients are applied to each acre. The preferred range is 6–14% active ingredients and 94–86% inert carrier.

The proportions of the active ingredients within the carrier, consisting of parathion, of either type mentioned, and paraformaldehyde are preferably approximately 50% parathion–50% paraformaldehyde, but such may also be varied considerably from approximately 25% parathion–75% paraformaldehyde to approximately 75% parathion–25% paraformaldehyde. Apparently the percentages are not critical. In blending of these two active ingredients, a synergistic action apparently occurs in some manner not completely understood. However, it appears that if an excess of parathion is used, this excess will not continue to be effective for an extended period of time. On the other hand, it appears that if an excess of paraformaldehyde is used, it will not add to or delete from the basic property of the blend.

The blending of the active ingredients with the carrier is preferably by first mixing the paraformaldehyde with the carrier, the granular clay, and then adding and mixing in the liquid parathion. In such mixing operations, the paraformaldehyde is ground to particles of a size similar to that of the carrier to assure a more uniform spread on the field by commercial spreaders. The liquid parathion will soak into the clay granules and also wet the paraformaldehyde particles in a manner as to cause these particles to stick to the clay granules. The viscosity of the parathion can be controlled for this mixing operation by using selected proportions of ethyl and methyl parathion.

The following examples are exemplary of the invention:

EXAMPLE 1

A 500-pound batch of the improved soil pesticide was prepared using 435 pounds of granular clay, sized to pass a 15-mesh screen and be retained upon a 30-mesh screen. To this clay 30 pounds of technical paraformaldehyde, ground to pass a 30-mesh screen, was added and mixed with the clay. As the clay and paraformaldehyde became completely intermixed, 35 pounds of ethyl parathion was added with the mixing continued until the parathion was completely absorbed in the clay and adsorbed upon the paraformaldehyde. The product was then sealed in closed containers until ready for use.

EXAMPLE 2

The material prepared in Example 1 was applied 50 pounds per acre, by a simple broadcast method, onto a 10 acre plot of a twenty acre field in Berthoud, Colo. to provide a treated plot and a control plot. This field was seriously infested with nematode, symphylan and sugar beet root maggot. Both plots were then fertilized, cultivated and planted in sugar beets. By observing soil samples and samples of the plants in both the treated plot and control plot during growing season and at harvest, it was apparent that nematodes, symphylan and sugar beet root maggots were completely controlled in the treated plot although they were prevalent in the untreated control plot. The plants in the treated plot were healthier with better formed beets and at harvest, the yield of the treated plot was approximately 20 tons of sugar beets per acre while the yield of the control plot was approximately 14 tons per acre. After harvest a chemical analysis revealed no traces of parathion or paraformaldehyde on or in the harvested beets from the control plot.

EXAMPLE 3

For each 100 pounds of a batch of a pesticide, the active ingredients included 20 pounds of paraformaldehyde and 6 pounds of parathion, the inert ingredient comprising clay granules. This batch was applied at 50 pounds per acre onto a plot infested with symphylan. It was observed that the beets during growing season and at harvest did not contain symphylan and thus, it was concluded that the symphylan was controlled.

EXAMPLE 4

For each 100 pounds of a batch of pesticide, the active ingredients included 6 pounds of paraformaldehyde and 6 pounds of parathion and the inert ingredient was a granular clay. The blend was applied to a test plot of ground at 15 pounds per acre with a band applicator applying strips of the pesticide at each side of a planting row. Through observing the sugar beets from time to time during the growing season and at harvest, it was found that no sugar beet root maggots were present in this plot of ground while untreated check rows were heavily infested with sugar beet root maggots.

EXAMPLE 5

This batch, of 50 pounds, was blended to include 3 pounds of a blend of ethyl parathion and methyl parathion in approximate equal amounts and 3½ pounds of paraformaldehyde and 43½ pounds of shredded manure. It was observed that the parathion soaked into the manure and also wet the paraformaldehyde particles and was suitable for application onto a field the same as Example 1.

EXAMPLE 6

A test batch was prepared and for each 100 pounds thereof, the active ingredients consisted of 6 pounds of ethyl parathion and 6½ pounds of paraformaldehyde. The inert ingredients consisted of 10 pounds of granular attaclay and 77½ pounds of granular bentonite. The ingredients were blended as heretofore described.

EXAMPLE 7

Six acres of a 12 acre field north of Windsor, Colo. known to contain symphylan were treated with the material of Example 6. The other six acres were for checking purposes. The treatment was by applying 50 pounds per acre, applied by a fertilizer applicator and then mulched 3 to 6 inches into the soil. Sugar beets were then planted in both plots. The growth of the sugar beets was observed by digging specimen plants and taking soil samples from time to time and at harvest. The plants in the treated plot were far healthier than in the untreated plot. A minimum number of symphylan were observed in the beets and in soil samples of the treated plot, but a large number of symphylan were observed in the beets and in soil samples of the untreated plot. It was further observed that the untreated portion of the soil also became infested by sugar beet root maggots. Both symphylan and maggots were observed to be controlled in the treated plot and yield in the treated plot was approximately 21 tons per acre while the yield of the untreated plot was approximately 17 tons per acre.

I have now described my invention in detail and the same is more specifically set forth in the following claims.

I claim:

1. A composition to protect root crops from insects comprising an insert controlling amount of a blend of paraformaldehyde and a parathion selected from the group consisting of ethyl parathion and combinations of ethyl parathion and methyl parathion containing at least sufficient ethyl parathion as to render the blend liquid, in an inert granular carrier, said parathion and said paraformaldehyde being present in the proportion of from about 25% to about 75% parathion to from about 75% to about 25% paraformaldehyde, and the proportions of said carrier to the parathion-paraformaldehyde blend being greater than a 1 to 1 ratio.

2. The composition set forth in claim 1, wherein the parathion-paraformaldehyde blend is in the range of 6 to 14 percent of the pesticide and the carrier is in the range of 94 to 86 percent thereof.

3. A process for the treatment of a plot of soil to eradicate insect pests, comprising dispersing a composition as defined in claim 1 over the plot prior to planting in a concentration of at least approximately 3 pounds of parathion and 3 pounds of paraformaldehyde per acre.

4. A process for producing a soil insecticide including the steps of mixing particulate paraformaldehyde with an inert carrier comprising granular clay, and thereafter adding and blending into the mixture a parathion selected from the group consisting of ethyl parathion and a blend of ethyl parathion and methyl parathion containing at least sufficient ethyl parathion as to render the blend liquid, in an amount approximately equal to the amount of the paraformaldehyde, the proportions of the carrier to the parathion-paraformaldehyde mixture being greater than a 1 to 1 ratio.

5. The process defined in claim 4, wherein the parathion consists of a blend of ethyl parathion and methyl parathion.

References Cited

UNITED STATES PATENTS

| | | | |
|---|---|---|---|
| 3,074,845 | 1/1963 | Geary | 424—218 X |
| 3,145,139 | 8/1964 | Fearing | 424—218 X |
| 3,223,513 | 12/1965 | Geary | 424—218 X |
| 3,284,295 | 11/1966 | Johnson | 424—218 |
| 3,301,752 | 1/1967 | Bubash | 424—342 X |
| 3,366,539 | 1/1968 | Woodbury | 424—218 |

OTHER REFERENCES

Merck Index, 8th ed., 1968, p. 783.

ALBERT T. MEYERS, Primary Examiner

L. SCHENKMAN, Assistant Examiner

U.S. Cl. X.R.

424—342